(12) United States Patent
Miao et al.

(10) Patent No.: US 11,120,595 B2
(45) Date of Patent: Sep. 14, 2021

(54) FACE SWAP METHOD AND COMPUTING DEVICE

(71) Applicant: Ping An Technology (Shenzhen) Co., Ltd., Shenzhen (CN)

(72) Inventors: Jinghong Miao, San Jose, CA (US); Yuchuan Gou, Sunnyvale, CA (US); Minghao Li, Mountain View, CA (US); Jui-Hsin Lai, Santa Clara, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 88 days.

(21) Appl. No.: 16/729,165

(22) Filed: Dec. 27, 2019

(65) Prior Publication Data

US 2021/0201544 A1 Jul. 1, 2021

(51) Int. Cl.
*G06T 11/60* (2006.01)
*G06K 9/00* (2006.01)
*G06K 9/34* (2006.01)

(52) U.S. Cl.
CPC .......... *G06T 11/60* (2013.01); *G06K 9/00234* (2013.01); *G06K 9/00281* (2013.01); *G06K 9/34* (2013.01)

(58) Field of Classification Search
None
See application file for complete search history.

(56) References Cited

U.S. PATENT DOCUMENTS

| | | | |
|---|---|---|---|
| 10,878,612 B2* | 12/2020 | Wang | G06T 15/04 |
| 2017/0140210 A1* | 5/2017 | Sun | G06K 9/4671 |
| 2017/0178287 A1* | 6/2017 | Anderson | G06K 9/00228 |
| 2018/0350030 A1* | 12/2018 | Simons | G06T 3/0068 |
| 2019/0005305 A1* | 1/2019 | Huang | G06T 11/00 |
| 2019/0206101 A1* | 7/2019 | De la Torre | G06K 9/00228 |
| 2019/0251335 A1* | 8/2019 | Han | G06K 9/00288 |
| 2019/0392197 A1* | 12/2019 | Hou | G06K 9/00281 |
| 2020/0175729 A1* | 6/2020 | Lee | G06T 5/30 |
| 2020/0234508 A1* | 7/2020 | Shaburov | G06K 9/00281 |
| 2020/0294294 A1* | 9/2020 | Petriv | G06K 9/6202 |

* cited by examiner

*Primary Examiner* — David H Chu
(74) *Attorney, Agent, or Firm* — ScienBiziP, P.C.

(57) ABSTRACT

In a face swap method carried out by an electronic device, a first head image is segmented from a destination image. First facial landmarks and a first hair mask are obtained according to the first head image. A second head image is segmented from a source image. Second facial landmarks and a second hair mask are obtained according to the second head image. If at least one eye landmark in the second facial landmarks is covered by hair, the second head image and the second hair mask are processed and repaired so as to obtain a swapped-face image with eyes not covered by hair.

20 Claims, 3 Drawing Sheets

FACE SWAP METHOD AND COMPUTING DEVICE

FIELD

The subject matter herein generally relates to image processing, and particularly to a face swap method and a computing device employing the method.

BACKGROUND

At present, face recognition technology is applied in face swaps, where a face in a destination image or video is replaced with a face in a source image. However, when eyes in the source image are covered by hair, eyes in a generated and swapped image may be also covered by hair, which may not be desired.

DETAILED DESCRIPTION

The present disclosure is given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. Described embodiments are merely embodiments which are a part of the present disclosure, and do not include every embodiment. All other embodiments obtained by those of ordinary skill in the art based on the embodiments of the present disclosure without creative efforts are within the scope of the claims.

Unless defined otherwise, all technical and scientific terms herein have the same meaning as used in the field of the art technology as generally understood. The terms used in the present disclosure are for the purposes of describing particular embodiments and are not intended to limit the present disclosure.

A face swap method can be applied to one or more computing devices. A computing device is a device capable of automatically performing numerical calculation and/or information processing according to an instruction set or stored in advance, and the hardware thereof includes, but is not limited to, a microprocessor, an application specific integrated circuit (ASIC), a field-programmable gate array (FPGA), a digital signal processor (DSP), or an embedded device, etc.

The computing device may be a desktop computer, a notebook, a palmtop computer, and a cloud server. The computing device can perform a human-computer interaction with a user through a keyboard, a mouse, a remote controller, a touch panel, or a voice control device.

Figure 1:
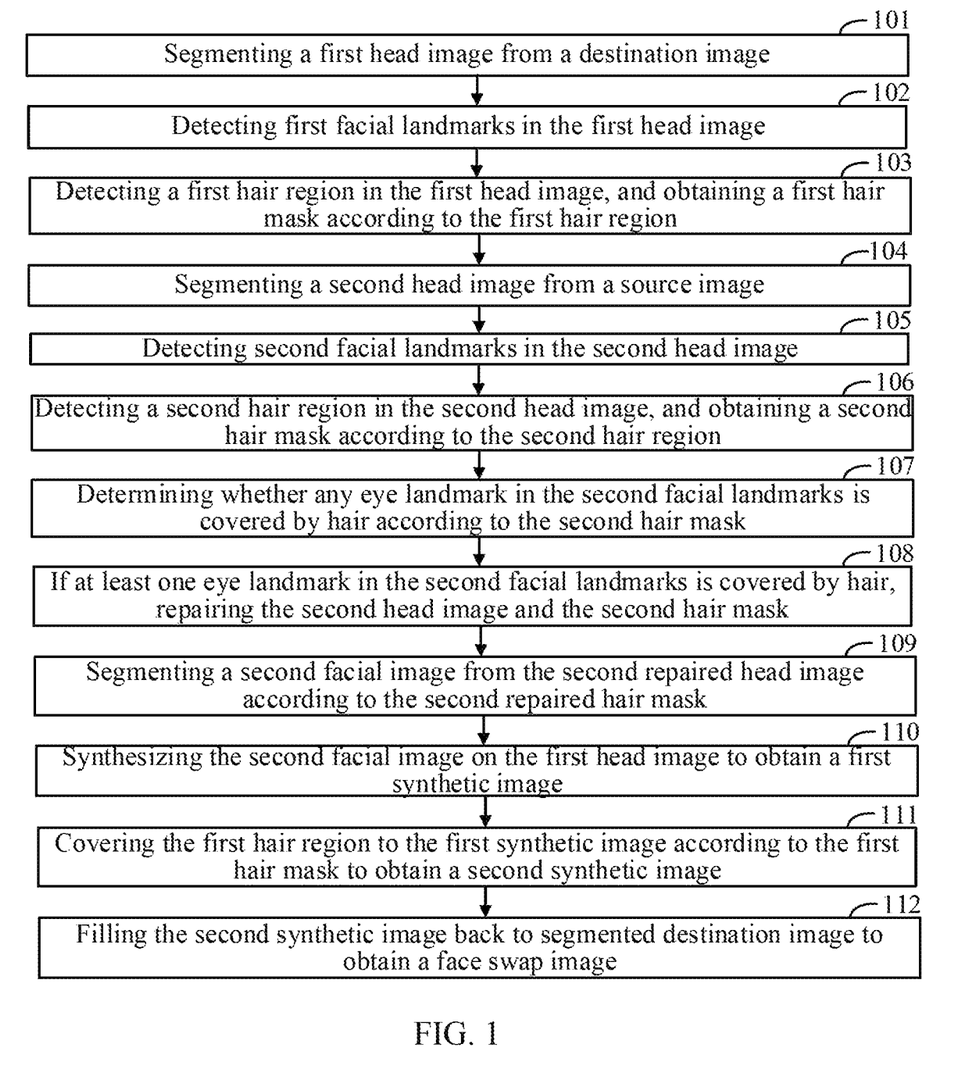
FIG. 1 is a flowchart of an embodiment of a face swap method.

FIG. 1 is a flowchart of an embodiment of a face swap method. In one embodiment, the method can be executed by a computing device. The method may repair eyes covered by hair in a source image to prevent such eyes from being covered by hair in a generated image.

The illustrated order of blocks in FIG. 1 is illustrative only and the order of the blocks can be changed according to different requirements. Additional blocks can be added or fewer blocks may be utilized without departing from this disclosure.

At block 101, the computing device may segment a first head image from a destination image.

The destination image may be a template image.

In one embodiment, segmenting the first head image from the destination image may include: detecting a first face bounding box in the destination image; and obtaining the first head image according to the first face bounding box.

The first face bounding box may be detected using a face detection model (for example, a face detection model in the Dlib library).

The first face bounding box may be extended in the destination image to obtain the first head image. For example, four sides of the first face frame may be extended outward by a quarter of a length of the first face bounding box to obtain the first head image.

In one embodiment, if multiple first face bounding boxes are detected from the destination image, a first maximum face bounding box with a largest area is selected from the multiple first face bounding boxes, and the first head image is obtained according to the first maximum face bounding box.

The purpose of segmenting the first head image from the destination image is to reduce the amount of data to be processed.

After segmenting the first head image from the destination image, a segmented destination image is obtained, which does not include the first head image.

At block 102, the computing device may detect first facial landmarks in the first head image.

The first facial landmarks may be detected using a facial landmarks detector (for example, a facial landmarks detector in the Dlib library).

In one embodiment, quantity of the first facial landmarks may be 68. The 68 first facial landmarks includes 17 facial contour landmarks (numbered 1 to 17), and 10 eyebrow landmarks including 5 right eyebrow landmarks (numbered as 18 to 22) and 5 left eyebrow landmarks (numbered 23 to 27), 9 nose landmarks (numbered 28 to 36), 12 eye landmarks including 6 right eye landmarks (numbered 37 to 42) and 6 left eye landmarks (numbered 43 to 48), and 20 mouth landmarks (numbered 49 to 68).

In another embodiment, in order to improve results, the first facial landmarks may further include 10 forehead landmarks including 5 right forehead landmarks and 5 left forehead landmarks. The right forehead landmarks are located above the right eye landmarks, and the left forehead landmarks are located above the left eye landmarks.

At block 103, the computing device may detect a first hair region in the first head image, and obtain a first hair mask according to the first hair region.

The first hair region may be detected using a hair segmentation method, such as a hair segmentation method based on a full convolutional network (FCN) model.

In one embodiment, in order to increase an accuracy of detection of the hair region, detecting a first hair region in the first head image may include: detecting the first hair region in the first head image using a test time augmentation (TTA) method. The first head image may be zoomed in or out with different zoom options to obtain zoomed images of different sizes. Multiple hair regions are detected from the zoomed images, and the first hair region is obtained according to the multiple hair regions.

The first hair mask may be obtained by representing hair regions (i.e., the first hair region) in the first head image as a color white, and representing non-hair regions in the first head image as a color black.

At block 104, the computing device may segment a second head image from a source image.

The source image may be a user input image. This method is used to replace a face in the destination image with a face in the source image.

In one embodiment, segmenting the second head image from the source image may include: detecting a second face bounding box in the source image; and obtaining the second head image according to the second face bounding box.

The second face bounding box may be detected using a face detection model (for example, a face detection model in the Dlib library).

The second face bounding box may be extended in the source image to obtain the second head image. For example, four sides of the second face bounding box are extended outward by a quarter of a length of the second face to obtain the second head image.

In one embodiment, if the source image includes multiple second face bounding boxes, a second maximum face bounding boxes with a largest area is selected from the multiple second face bounding boxes, and the second head image is obtained according to the second maximum face bounding box.

The purpose of segmenting the second head image from the source image is to reduce the amount of data to be processed.

In one embodiment, after the second head image is segmented from the source image, the method may further include: determining whether a size of the second head image is larger than a size of the first head image; if the size of the second head image is larger than the size of the first head image, adjusting the second head image to a same or similar size to the first head image.

For example, a ratio of a length of the second head image to a length of the first head image and a ratio of a width of the second head image to a width of the first head image are calculated, and the second head image is adjusted according to the smaller of the two ratios.

The purpose of adjusting the second head image to a same or similar size to the first head image is to reduce data to be processed while ensuring a clarity of the second head image.

At block 105, the computing device may detect second facial landmarks in the second head image.

The second facial landmarks in the second head image may be detected using a facial landmarks detector (for example, a facial landmarks detector in the Dlib library).

A quantity of the second facial landmarks may be equal to the quantity of the first facial landmarks. In one embodiment, the quantity of the second facial landmarks may be 68.

In another embodiment, in order to improve results, the second facial landmarks may be 78 in quantity, which include 5 right forehead landmarks and 5 left forehead landmarks.

At block 106, the computing device may detect a second hair region in the second head image, and obtain a second hair mask according to the second hair region.

The second hair region may be detected using a hair segmentation method, such as a hair segmentation method based on a full convolutional network (FCN) model.

In one embodiment, in order to increase an accuracy of detection of hair region, a TTA method may be used to detected the second hair region.

The second hair mask may be obtained by representing hair regions (i.e., the second hair region) in the second head image as the color white, and representing non-hair regions in the second head image as the color black.

At block 107, the computing device may determine whether any eye landmark in the second facial landmarks is covered by hair according to the second hair mask.

If an eye landmark in the second head image is in a hair region of the second hair mask, the eye landmark is covered by hair. If the eye landmark is in a non-hair region of the second hair mask, the eye landmark is not covered by hair.

In one embodiment, if at least one eye landmark in the second facial landmarks is covered by hair, the method may further include: determining whether a quantity of the at least one eye landmark is larger than a preset number; if the quantity of the at least one eye landmark is larger than the preset number, requiring re-entering of the source image.

In another embodiment, if at least one eye landmark in the second facial landmarks is covered by hair, the method may further include: calculating a ratio of the at least one eye landmark to overall eye landmarks in the second facial landmarks; determining whether the ratio is larger than a preset ratio (0.5, for example); if the ratio is larger than a preset ratio, requiring re-entering of the source image.

At block 108, if at least one eye landmark in the second facial landmarks is covered by hair, the computing device may repair the second head image and the second hair mask according to mirror landmarks of the at least one eye landmark to obtain a second repaired head image and a second repaired hair mask.

In one embodiment, before repairing the second head image and the second hair mask, the method may further include: determining whether any mirror landmark of the at least one eye landmark is covered by hair; if no mirror landmark of the at least one eye landmark is covered by hair, repairing the second head image and the second hair mask according to the mirror landmarks of the at least one eye landmark. Otherwise, if at least one mirror landmark of the at least one eye landmark is covered by hair, requiring re-entering of the source image.

The mirror landmarks and the at least one eye landmark are symmetrical in the second image. The mirror landmarks of the at least one eye landmark may be retrieved from the second facial landmarks according to a relationship between right eye landmarks and left eye landmarks.

Repairing the second head image according to the mirror landmarks of the at least one eye landmark may include: (1) partitioning the second head image into multiple triangles according to the second facial landmarks using Delaunay triangulation; (2) performing affine transformation on each triangle of the multiple triangles according to mirror landmarks of second facial landmarks defining the triangle to obtain a transformed triangle; (3) horizontally flipping the second head image to obtain a second flipped head image; (4) replacing a triangle corresponding to the at least one eye landmark in the second head image with the transformed triangle corresponding to the at least one eye landmark in the second flipped head image.

A method of repairing the second hair mask may be the same as a method of repairing the second head image.

At block 109, the computing device may segment a second facial image from the second repaired head image according to the second repaired hair mask.

Segmenting a second facial image from the second repaired head image means the removal of non-face regions (including hair and neck regions) in the second repaired head image to obtain a face region in the second repaired head image.

At block 110, the computing device may synthesize the second facial image on the first head image according to the first facial landmarks to obtain a first synthetic image.

The second facial image may be synthesized on the first head image according to the first facial landmarks. The first facial landmarks may instruct different parts of the second facial image to synthesize on the first head image, so as to obtain a good result of synthesis.

At block 111, the computing device may cover the first hair region to the first synthetic image according to the first hair mask to obtain a second synthetic image.

Synthesizing the second facial image on the first head image may obscure a portion where the hair and the face meet in the first head image. The obscured portion may be improved by covering the first hair region to the first synthetic image according to the first hair mask.

At block 112, the computing device may fill the second synthetic image back to segmented destination image to obtain a face swap image.

After the first head image is segmented from the destination image, the segmented destination image is obtained. The second synthetic image is filled back to where the first head image is located in the segmented destination image to obtain the face swap image.

When eyes in the source image are covered by hair, a generated image may be poor using existing face swap methods, where eyes may be also covered by hair. The method disclosed repairs eyes covered by hair in the source image to prevent eyes from being covered by hair in the generated image, and obtain a better face swap image.

In one embodiment, before repairing the second head image, the method may further include: retouching the second head image.

In one embodiment, retouching the second head image may include smoothing skin for the second head image.

Smoothing skin is also called boundary preservation. The purpose is to remove small spots and stains on a face in the second head image, while retaining global boundary information, such as nose and glasses. Smoothing skin may be performed on the second head image through an edge-preserving filter. Edge-preserving filters are a special type of filters that can effectively preserve edge information in an image during a filtering process, and are used to eliminate noise in the image.

Retouching the second head image may further include skin-whitening on the second head image.

The second head image may be an RGB image, and a pixel value of each pixel in the second head image includes red component, green component, and blue component. Each color component of each pixel in a face region of the second head image may be increased to make the pixel closer to white.

Retouching the second head image may further include adjusting brightness of the second head image.

In actual scenarios, skin tones in the source image may be uneven due to uneven lighting. For example, a left face region may be brighter than a right face region in the source image, which may affect a naturalness of a face swap result. The purpose of adjusting brightness of the second head image is to make skin color of the second head image uniform.

In one embodiment, adjusting brightness of the second head image may include:

(a) performing an affine transformation on the left face region and the right face region in the second head image to obtain a plurality of pixel pairs of the second head image, each pixel pair including a pixel in the left face region and a corresponding pixel in the right face region. A pixel pair can be denoted as $(a(x_a,y_a), b(x_b,y_a))$. The $a(x_a,y_a)$ is a pixel in the left face region, and the $b(x_b,y_a)$ is a corresponding pixel in the right face region.

(b) updating pixel values of each pixel pair of the second head image using brightness smoothing formulas. In one embodiment, the brightness smoothing formulas are:

$$(R,G,B)_{x_a,y_a}' = (1-\alpha)*(R,G,B)_{x_a,y_a} + \alpha*(R,G,B)_{x_b,y_b},$$

$$(R,G,B)_{x_b,y_b}' = (1-\beta)*(R,G,B)_{x_b,y_b} + \alpha*(R,G,B)_{x_a,y_a},$$

Where $\alpha=abs(y_a-y_{middle})$ and $\beta=abs(y_b-y_{middle})$.

$(R,G,B)_{x_a,y_a}$ represents an original pixel value of $a(x_a,y_a)$, $(R,G,B)_{x_a,y_a}'$ represents an updated pixel value of $a(x_a,y_a)$, $(R,G,B)_{x_b,y_b}$ represents an original pixel value of $b(x_b,y_a)$, $(R,G,B)_{x_b,y_b}'$ represents an updated pixel value of $b(x_b,y_a)$, $\alpha$ represents a horizontal distance from $a(x_a,y_a)$ to a face center line of the second head image, and $\beta$ represents a horizontal distance from $b(x_b,y_a)$ to the face center line.

In one embodiment, before repairing the second head image, the method may further include: adjusting the first facial landmarks according to the second facial landmarks.

Facial orientations and facial expressions in the destination image and the source image are not generally consistent.

In one embodiment, adjusting the first facial landmarks according to the second facial landmarks may include: adjusting the eye landmarks in the first facial landmarks.

Adjusting the eye landmarks in the first facial landmarks includes adjusting the right eye landmarks and the left eye landmarks in the first facial landmarks. The right eye landmarks and left eye landmarks may be adjusted in the same way. Adjustment of the right eye landmark in the first facial landmarks is as follows.

(a) Calculating a first right eye center (denoted as dst_right_eye_center) of the destination image according to the right eye landmarks of the destination image, and calculating a second right eye center (denoted as src_right_eye_center) of the source image according to the right eye landmarks of the source image.

$$dst\_right\_eye\_center = \sum_{i=37}^{42} dst\_landmarks[i]/6$$

$$src\_right\_eye\_center = \sum_{i=37}^{42} src\_landmarks[i]/6$$

In the above equations, dst_landmarks[i] represents a facial landmark in the destination image, and src_landmarks[i] represents a facial landmark in the source image.

(b) Calculating a first right eye width (denoted dst_right_eye_width) of the destination image according to the right eye landmarks of the destination image, and calculating a second right eye width (denoted as src_right_eye_width) of the source image according to the right eye landmarks of the source image.

$$dst\_right\_eye\_width = \|dst\_landmarks[37] - dst\_landmarks[42]\|_2$$

$$src\_right\_eye\_width = \|src\_landmarks[37] - src\_landmarks[42]\|_2$$

(c) Calculating a first ratio (denoted as src_right eye_ratio) of a difference between each right eye landmark of the source image and the second right eye center to the second right-eye width.

$$src\_right\_eye\_ratio = (src\_landmarks[37:40] - src\_right\_eye\_center)/src\_right\_eye\_width$$

(d) Calculating adjusted right eye landmarks (denoted as dst_right_eye_edited) of the destination image according to the first right eye width, the first right eye center, and the first ratio.

$$dst\_right\_eye\_edited=src\_right\_eye\_ratio*dst\_right\_eye\_width+dst\_right\_eye\_center$$

In one embodiment, adjusting the first facial landmarks according to the second facial landmarks may include adjusting nose landmarks in the first facial landmarks.

Adjustment of the nose landmarks in the first facial landmarks is as follows.

(a) Calculating a first nose center (denoted as dst_nose_center) of the destination image according to the nose landmarks of the destination image, and calculating a second nose center (denoted as src_nose_center) of the source image according to the nose landmarks of the source image.

$$dst\_nose\_center=\Sigma_{i=28}^{36}dst\_landmarks[i]/9$$

$$src\_nose\_center=\Sigma_{i=28}^{36}src\_landmarks[i]/9$$

(b) Calculating a first nose width (denoted as dst_nose_width) of the destination image according to the nose landmarks of the destination image, calculating a second nose width (denoted as src_nose_width) of the source image according to the nose landmarks of the source image, calculating a first eye width (denoted as dst_eyes_width) of the destination image according to the first left eye center and the first right eye center, and calculating a second eye width (denoted as src_eyes_width) of the source image is calculated according to the second left eye center and the second right eye center.

$$dst\_nose\_width=\|dst\_landmarks[32]-dst\_landmarks[36]\|_2$$

$$src\_nose\_width=\|src\_landmarks[32]-src\_landmarks[36]\|_2$$

$$dst\_eyes\_width=\|dst\_left\_eye\_center-dst\_right\_eye\_center\|_2$$

$$src\_eyes\_width=\|src\_left\_eye\_center-src\_right\_eye\_center\|_2$$

(c) Calculating a second (denoted as src_nose2eyes_ratio) of the second nose and the second eye width.

$$src\_nose2eyes\_ratio=src\_nose\_width/src\_eyes\_width$$

(d) Calculating a first adjusted nose width (denoted as dst_nose_width_edited) according to the second ratio and the first nose width.

$$dst\_nose\_width\_edited=src\_nose2eyes\_ratio*dst\_eyes\_width$$

(e) Calculating a third ratio (denoted as src_nose_ratio) of a difference between each nose landmark of the source image and the second nose center to the second nose width.

$$src\_nose\_ratio=(src\_landmarks[28:36]-src\_nose\_center)/src\_nose\_width.$$

(f) Calculating adjusted nose landmarks (denoted as dst_nose_edited) of the destination image according to the first adjusted nose width, the first nose center and the third ratio.

$$dst\_nose\_edited=src\_nose\_ratio*dst\_nose\_width\_edited+dst\_nose\_center$$

In one embodiment, before segmenting the second facial image from the second repaired head image according to the second repaired hair mask, the method may further include: segmenting a first facial image from the first head image according to the second repaired hair mask; and adjusting skin tones of the second facial image according to the first facial image.

Adjustment of skin tones of the second facial image according to the first facial image is by:

(1) Converting the first facial image from RGB space to HSV space to obtain a first HSV facial image, calculating modal values of H component, S component, and V component of the first HSV facial image, and filling the first facial image using the modal values to obtain a first filled image.

(2) Replacing corners of mouth and lower cheeks in the first HSV facial image with corresponding portions of the first filled image.

When the destination image displays a smiling expression, the corners of the mouth may be dark, so that corners of the mouth in a generated face swap image should also be dark. The method replaces the corners of mouth and lower cheeks in the first HSV facial image with corresponding portions of the first filled image, so that so that the corner-coloration of mouth in the generated face swap image is more natural.

(3) Linearly adding pixel values of the first HSV facial image and pixel values of the first filled image to obtain a first smooth image.

In order to reduce an effect of uneven lighting on a face in the destination image, the method linearly adds the pixel values of the first HSV facial image and the pixel values of the first filled image to make the first HSV facial image smooth.

(4) Blurring out the first smooth image and the second facial image applying Gaussian blur to obtain a first blurred image and a second blurred image.

In one embodiment, values of a Gaussian kernel of the Gaussian blur may be equal to the first eye width.

(5) Dividing the first blurred image by the second blurred image to obtain a quotient, and multiplying the quotient and the second facial image to obtain a second adjusted facial image.

Correspondingly, synthesizing the second facial image on the first head image according to the first facial landmarks may include: synthesizing the adjusted second facial image on the first head image according to the first facial landmarks.

In one embodiment, synthesizing the adjusted second facial image on the first head image according to the first facial landmarks may include: obtaining a facial mask of according to the second adjusted facial image; and synthesizing the second facial image on the first head image according to the first facial landmarks and the facial mask.

A Poisson Blending algorithm may be applied to synthesize the second adjusted facial image on the first head image under the guidance of the first facial landmarks and the facial mask.

Figure 2:
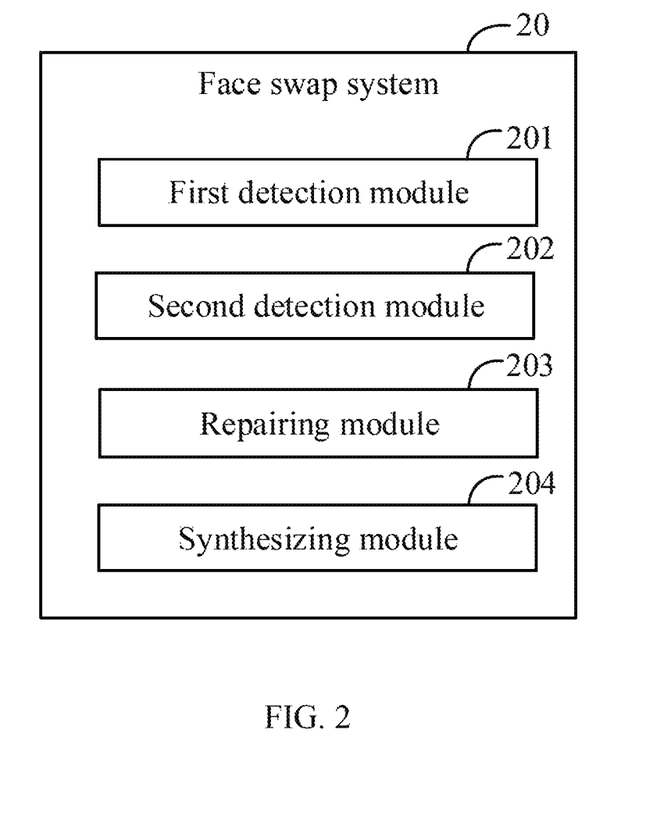
FIG. 2 is a block diagram of an embodiment of function modules of a face swap system.

FIG. 2 is a block diagram of an embodiment of function modules of a face swap system. The system 20 may repair eyes covered by hair in a source image to prevent eyes from being covered by hair in a generated image by swapping faces.

The system 20 runs in a computing device. The system 20 can include a plurality of modules. The plurality of modules can comprise computerized instructions in a form of one or more computer-readable programs that can be stored in a non-transitory computer-readable medium (e.g., a storage device of the computing device), and executed by at least one processor of the computing device.

In at least one embodiment, the system 20 can include a plurality of modules. The plurality of modules can include, but is not limited to, a first detection module 201, a second detection module 202, a repairing module 203, and a synthesizing module 204. The modules 201-204 can comprise computerized instructions in the form of one or more computer-readable programs that can be stored in the non-transitory computer-readable medium (e.g., the storage device of the computing device), and executed by the at least one processor of the computing device.

The first detection module 201 may segment a first head image from a destination image.

The destination image may be a template image.

In one embodiment, segmenting the first head image from the destination image may include: detecting a first face bounding box in the destination image; and obtaining the first head image according to the first face bounding box.

The first face bounding box may be detected using a face detection model (for example, a face detection model in the Dlib library).

The first face bounding box may be extended in the destination image to obtain the first head image. For example, four sides of the first face frame may be extended outward by a quarter of a length of the first face bounding box to obtain the first head image.

In one embodiment, if multiple first face bounding boxes are detected from the destination image, a first maximum face bounding box with a largest area is selected from the multiple first face bounding boxes, and the first head image is obtained according to the first maximum face bounding box.

The purpose of segmenting the first head image from the destination image is to reduce data to be processed.

After segmenting the first head image from the destination image, a segmented destination image is obtained, which does not include the first head image.

The first detection module 201 may further detect first facial landmarks in the first head image.

The first facial landmarks may be detected using a facial landmarks detector (for example, a facial landmarks detector in the Dlib library).

In one embodiment, a quantity of the first facial landmarks may be 68, including 17 facial contour landmarks (numbered 1 to 17), and 10 eyebrow landmarks including 5 right eyebrow landmarks (numbered as 18 to 22) and 5 left eyebrow landmarks (numbered 23 to 27), 9 nose landmarks (numbered 28 to 36), 12 eye landmarks including 6 right eye landmarks (numbered 37 to 42) and 6 left eye landmarks (numbered 43 to 48), and 20 mouth landmarks (numbered 49 to 68).

In another embodiment, in order to improve a result of the method of FIG. 1, the first facial landmarks may further include 10 forehead landmarks including 5 right forehead landmarks and 5 left forehead landmarks. The right forehead landmarks are located above the right eye landmarks, and the left forehead landmarks are located above the left eye landmarks.

The first detection module 201 may further detect a first hair region in the first head image, and obtain a first hair mask according to the first hair region.

The first hair region may be detected using a hair segmentation method, such as a hair segmentation method based on a full convolutional network (FCN) model.

In one embodiment, in order to increase an accuracy of hair region detection, detecting a first hair region in the first head image may include: detecting the first hair region in the first head image using a test time augmentation (TTA) method. The first head image may be zoomed in or out with different zoom options to obtain zoomed images of different sizes. Multiple hair regions are detected from the zoomed images, and the first hair region is obtained according to the multiple hair regions.

The first hair mask may be obtained by representing hair regions (i.e., the first hair region) in the first head image as a color white, and representing non-hair regions in the first head image as a color black.

The second detection module 202 may segment a second head image from a source image.

The source image may be a user input image. This method is used to replace a face in the destination image with a face in the source image.

In one embodiment, segmenting the second head image from the source image may include: detecting a second face bounding box in the source image; and obtaining the second head image according to the second face bounding box.

The second face bounding box may be detected using a face detection model (for example, a face detection model in the Dlib library).

The second face bounding box may be extended in the source image to obtain the second head image. For example, four sides of the second face bounding box are extended outward by a quarter of a length of the second face to obtain the second head image.

In one embodiment, if the source image includes multiple second face bounding boxes, a second maximum face bounding boxes with a largest area is selected from the multiple second face bounding boxes, and the second head image is obtained according to the second maximum face bounding box.

The purpose of segmenting the second head image from the source image is to reduce data to be processed.

In one embodiment, after the second head image is segmented from the source image, the method may further include: determining whether a size of the second head image is larger than a size of the first head image; if the size of the second head image is larger than the size of the first head image, adjusting the second head image to a same or similar size to the first head image.

For example, a ratio of a length of the second head image to a length of the first head image and a ratio of a width of the second head image to a width of the first head image are calculated, and the second head image is adjusted according to the smaller of the two ratios.

The purpose of adjusting the second head image to a same or similar size to the first head image is to reduce data to be processed while ensuring a clarity of the second head image.

The second detection module 202 may further detect second facial landmarks in the second head image.

The second facial landmarks in the second head image may be detected using a facial landmarks detector (for example, a facial landmarks detector in the Dlib library).

A quantity of the second facial landmarks may be equal to the quantity of the first facial landmarks. In one embodiment, the quantity of the second facial landmarks may be 68.

In another embodiment, in order to improve a result of the method of FIG. 1, the second facial landmarks may be 78, which include 5 right forehead landmarks and 5 left forehead landmarks.

The second detection module 202 may further detect a second hair region in the second head image, and obtain a second hair mask according to the second hair region.

The second hair region may be detected using a hair segmentation method, such as a hair segmentation method based on a full convolutional network (FCN) model.

In one embodiment, in order to increase an accuracy of hair region detection, a TTA method may be used to detected the second hair region.

The second hair mask may be obtained by representing hair regions (i.e., the second hair region) in the second head image as the color white, and representing non-hair regions in the second head image as the color black.

The repairing module 203 may determine whether any eye landmark in the second facial landmarks is covered by hair according to the second hair mask.

If an eye landmark in the second head image is in a hair region of the second hair mask, the eye landmark is covered by hair. If the eye landmark is in a non-hair region of the second hair mask, the eye landmark is not covered by hair.

In one embodiment, if at least one eye landmark in the second facial landmarks is covered by hair, the method may further include: determining whether a quantity of the at least one eye landmark is larger than a preset number; if the quantity of the at least one eye landmark is larger than the preset number, requiring re-entering of the source image.

In another embodiment, if at least one eye landmark in the second facial landmarks is covered by hair, the method may further include: calculating a ratio of the at least one eye landmark to overall eye landmarks in the second facial landmarks; determining whether the ratio is larger than a preset ratio (0.5, for example); if the ratio is larger than a preset ratio, requiring re-entering of the source image.

If at least one eye landmark in the second facial landmarks is covered by hair, the repairing module 203 may further repair the second head image and the second hair mask according to mirror landmarks of the at least one eye landmark to obtain a second repaired head image and a second repaired hair mask.

In one embodiment, before repairing the second head image and the second hair mask, the method may further include: determining whether any mirror landmark of the at least one eye landmark is covered by hair; if no mirror landmark of the at least one eye landmark is covered by hair, repairing the second head image and the second hair mask according to the mirror landmarks of the at least one eye landmark. Otherwise, if at least one mirror landmark of the at least one eye landmark is covered by hair, requiring re-entering of the source image.

The mirror landmarks and the at least one eye landmark are symmetrical in the second image. The mirror landmarks of the at least one eye landmark may be retrieved from the second facial landmarks according to a relationship between right eye landmarks and left eye landmarks.

Repairing the second head image according to the mirror landmarks of the at least one eye landmark may include: (1) partitioning the second head image into multiple triangles according to the second facial landmarks using Delaunay triangulation; (2) performing affine transformation on each triangle of the multiple triangles according to mirror landmarks of second facial landmarks defining the triangle to obtain a transformed triangle; (3) horizontally flipping the second head image to obtain a second flipped head image; (4) replacing a triangle corresponding to the at least one eye landmark in the second head image with the transformed triangle corresponding to the at least one eye landmark in the second flipped head image.

A method of repairing the second hair mask may be the same as a method of repairing the second head image.

The synthesizing module 204 may segment a second facial image from the second repaired head image according to the second repaired hair mask.

Segmenting a second facial image from the second repaired head image means removal of non-face regions (including hair and neck regions) in the second repaired head image to obtain a face region in the second repaired head image.

The synthesizing module 204 may further synthesize the second facial image on the first head image according to the first facial landmarks to obtain a first synthetic image.

The second facial image may be synthesized on the first head image according to the first facial landmarks. The first facial landmarks may instruct different parts of the second facial image to synthesize on the first head image, so as to obtain a good synthesis result.

The synthesizing module 204 may further cover the first hair region to the first synthetic image according to the first hair mask to obtain a second synthetic image.

Synthesizing the second facial image on the first head image may obscure a portion where the hair and the face meet in the first head image. The obscure portion may be improved by covering the first hair region to the first synthetic image according to the first hair mask.

The synthesizing module 204 may further fill the second synthetic image back to segmented destination image to obtain a face swap image.

After the first head image is segmented from the destination image, the segmented destination image is obtained. The second synthetic image is filled back to where the first head image is located in the segmented destination image to obtain the face swap image.

When eyes in the source image are covered by hair, a generated image of face swap may be poor using existing face swap methods, where eyes may be also covered by hair. The method repairs eyes covered by hair in the source image to prevent eyes from being covered by hair in the generated image, and obtains a better face swap image.

In one embodiment, before repairing the second head image, the repairing module 203 may further retouch the second head image.

In one embodiment, retouching the second head image may include smoothing skin for the second head image.

Smoothing skin is also called boundary preservation. The purpose is to remove small spots and stains on a face in the second head image, while retaining global boundary information, such as nose and glasses. Smoothing skin may be performed on the second head image through an edge-preserving filter. Edge-preserving filters are a special type of filters that can effectively preserve edge information in an image during a filtering process, and are used to eliminate noise in the image.

Retouching the second head image may further include skin-whitening on the second head image.

The second head image may be an RGB image, and a pixel value of each pixel in the second head image includes red component, green component, and blue component. Each color component of each pixel in a face region of the second head image may be increased to make the pixel closer to white.

Retouching the second head image may further include adjusting brightness of the second head image.

In actual scenarios, skin tones in the source image may be uneven due to uneven lighting. For example, a left face region may be brighter than a right face region in the source image, which may affect a naturalness of a face swap result. The purpose of adjusting brightness of the second head image is to make skin color of the second head image uniform.

In one embodiment, adjusting brightness of the second head image may include:

(a) performing an affine transformation on the left face region and the right face region in the second head image to obtain a plurality of pixel pairs of the second head image, each pixel pair including a pixel in the left face region and a corresponding pixel in the right face region. A pixel pair can be denoted as $(a(x_a,y_a), b(x_b,y_a))$, the $a(x_a,y_a)$ is a pixel in the left face region, and the $b(x_b,y_a)$ is a corresponding pixel in the right face region.

(b) updating pixel values of each pixel pair of the second head image using brightness smoothing formulas. In one embodiment, the brightness smoothing formulas are as follows:

$$(R,G,B)_{x_a,y_a}' = (1-\alpha)*(R,G,B)_{x_a,y_a} + \alpha*(R,G,B)_{x_b,y_b},$$

$$(R,G,B)_{x_b,y_b}' = (1-\beta)*(R,G,B)_{x_b,y_b} + \alpha*(R,G,B)_{x_a,y_a},$$

Where $\alpha = abs(y_a - y_{middle})$ and $\beta = abs(y_b - y_{middle})$.

$(R,G,B)_{x_a,y_a}$ represents an original pixel value of $a(x_a,y_a)$, $(R,G,B)_{x_a,y_a}'$ represents an updated pixel value of $a(x_a,y_a)$, $(R,G,B)_{x_b,y_b}$ represents an original pixel value of $b(x_b,y_a)$, $(R,G,B)_{x_b,y_b}'$ represents an updated pixel value of $b(x_b,y_a)$, $\alpha$ represents a horizontal distance from $a(x_a,y_a)$ to a face center line of the second head image, and $\beta$ represents a horizontal distance from $b(x_b,y_a)$ to the face center line.

In one embodiment, before repairing the second head image, the repairing module 203 may further adjust the first facial landmarks according to the second facial landmarks.

Facial orientations and facial expressions in the destination image and the source image are generally inconsistent.

In one embodiment, adjusting the first facial landmarks according to the second facial landmarks may include: adjusting the eye landmarks in the first facial landmarks.

Adjusting the eye landmarks in the first facial landmarks includes adjusting the right eye landmarks and the left eye landmarks in the first facial landmarks. The right eye landmarks and left eye landmarks may be adjusted in the same way. Adjustment of the right eye landmark in the first facial landmarks is described as follows.

(a) Calculating a first right eye center (denoted as dst_right_eye_center) of the destination image according to the right eye landmarks of the destination image, and calculating a second right eye center (denoted as src_right_eye_center) of the source image according to the right eye landmarks of the source image.

$$dst\_right\_eye\_center = \Sigma_{i=37}^{42} dst\_landmarks[i]/6$$

$$src\_right\_eye\_center = \Sigma_{i=37}^{42} src\_landmarks[i]/6$$

In the equations, dst_landmarks[i] represents a facial landmark in the destination image, and src_landmarks[i] represents a facial landmark in the source image.

(b) Calculating a first right eye width (denoted dst_right_eye_width) of the destination image according to the right eye landmarks of the destination image, and calculating a second right eye width (denoted as src_right_eye_width) of the source image according to the right eye landmarks of the source image.

$$dst\_right\_eye\_width = \|dst\_landmarks[37] - dst\_landmarks[42]\|_2$$

$$src\_right\_eye\_width = \|src\_landmarks[37] - src\_landmarks[42]\|_2$$

(c) Calculating a first ratio (denoted as src_right_eye_ratio) of a difference between each right eye landmark of the source image and the second right eye center to the second right-eye width.

$$src\_right\_eye\_ratio = (src\_landmarks[37:40] - src\_right\_eye\_center)/src\_right\_eye\_width$$

(d) Calculating adjusted right eye landmarks (denoted as dst_right_eye_edited) of the destination image according to the first right eye width, the first right eye center, and the first ratio.

$$dst\_right\_eye\_edited = src\_right\_eye\_ratio * dst\_right\_eye\_width + dst\_right\_eye\_center$$

In one embodiment, adjusting the first facial landmarks according to the second facial landmarks may include adjusting nose landmarks in the first facial landmarks.

Adjustment of the nose landmarks in the first facial landmarks is:

(a) Calculating a first nose center (denoted as dst_nose_center) of the destination image according to the nose landmarks of the destination image, and calculating a second nose center (denoted as src_nose_center) of the source image according to the nose landmarks of the source image.

$$dst\_nose\_center = \Sigma_{i=28}^{36} dst\_landmarks[i]/9$$

$$src\_nose\_center = \Sigma_{i=28}^{36} src\_landmarks[i]/9$$

(b) Calculating a first nose width (denoted as dst_nose_width) of the destination image according to the nose landmarks of the destination image, calculating a second nose width (denoted as src_nose_width) of the source image according to the nose landmarks of the source image, calculating a first eye width (denoted as dst_eyes_width) of the destination image according to the first left eye center and the first right eye center, and calculating a second eye width (denoted as src_eyes_width) of the source image is calculated according to the second left eye center and the second right eye center.

$$dst\_nose\_width = \|dst\_landmarks[32] - dst\_landmarks[36]\|_2$$

$$src\_nose\_width = \|src\_landmarks[32] - src\_landmarks[36]\|_2$$

$$dst\_eyes\_width = \|dst\_left\_eye\_center - dst\_right\_eye\_center\|_2$$

$$src\_eyes\_width = \|src\_left\_eye\_center - src\_right\_eye\_center\|_2$$

(c) Calculating a second ratio (denoted as ratio src_nose2eyes_ratio) of the second nose and the second eye width.

$$src\_nose2eyes\_ratio = src\_nose\_width/src\_eyes\_width$$

(d) Calculating a first adjusted nose width (denoted as dst_nose_width_edited) according to the second ratio and the first nose width.

$$dst\_nose\_width\_edited = src\_nose2eyes\_ratio * dst\_eyes\_width$$

(e) Calculating a third ratio (denoted as src_nose_ratio) of a difference between each nose landmark of the source image and the second nose center to the second nose width.

$$src\_nose\_ratio = (src\_landmarks[28:36] - src\_nose\_center)/src\_nose\_width.$$

(f) Calculating adjusted nose landmarks (denoted as dst_nose_edited) of the destination image according to the first adjusted nose width, the first nose center, and the third ratio.

$$dst\_nose\_edited = src\_nose\_ratio * dst\_nose\_width\_edited + dst\_nose\_center$$

In one embodiment, before segmenting the second facial image from the second repaired head image according to the second repaired hair mask, the synthesizing module 204 may further segment a first facial image from the first head image according to the second repaired hair mask; and adjust skin tones of the second facial image according to the first facial image.

Adjustment of skin tones of the second facial image according to the first facial image is by:

(1) Converting the first facial image from RGB space to HSV space to obtain a first HSV facial image, calculating modal values of H component, S component, and V component of the first HSV facial image, and filling the first facial image using the modal values to obtain a first filled image.

(2) Replacing corners of mouth and lower cheeks in the first HSV facial image with corresponding portions of the first filled image.

When the destination image displays a smiling expression, the corners of the mouth may be dark, so that corners of the mouth in a generated face swap image may also be dark. The method replaces the corners of mouth and lower cheeks in the first HSV facial image with corresponding portions of the first filled image, so that the corner-coloration of mouth in the generated face swap image is more natural.

(3) Linearly adding pixel values of the first HSV facial image and pixel values of the first filled image to obtain a first smooth image.

In order to reduce an effect of uneven lighting on a face in the destination image, the method linearly adds the pixel values of the first HSV facial image and the pixel values of the first filled image to make the first HSV facial image smooth.

(4) Blurring out the first smooth image and the second facial image applying Gaussian blur to obtain a first blurred image and a second blurred image.

In one embodiment, values of a Gaussian kernel of the Gaussian blur may be equal to the first eye width.

(5) Dividing the first blurred image by the second blurred image to obtain a quotient, and multiplying the quotient and the second facial image to obtain a second adjusted facial image.

Correspondingly, synthesizing the second facial image on the first head image according to the first facial landmarks may include: synthesizing the adjusted second facial image on the first head image according to the first facial landmarks.

In one embodiment, synthesizing the adjusted second facial image on the first head image according to the first facial landmarks may include: obtaining a facial mask of according to the second adjusted facial image; and synthesizing the second facial image on the first head image according to the first facial landmarks and the facial mask.

A Poisson Blending algorithm may be applied to synthesize the second adjusted facial image on the first head image under the guidance of the first facial landmarks and the facial mask.

Figure 3:
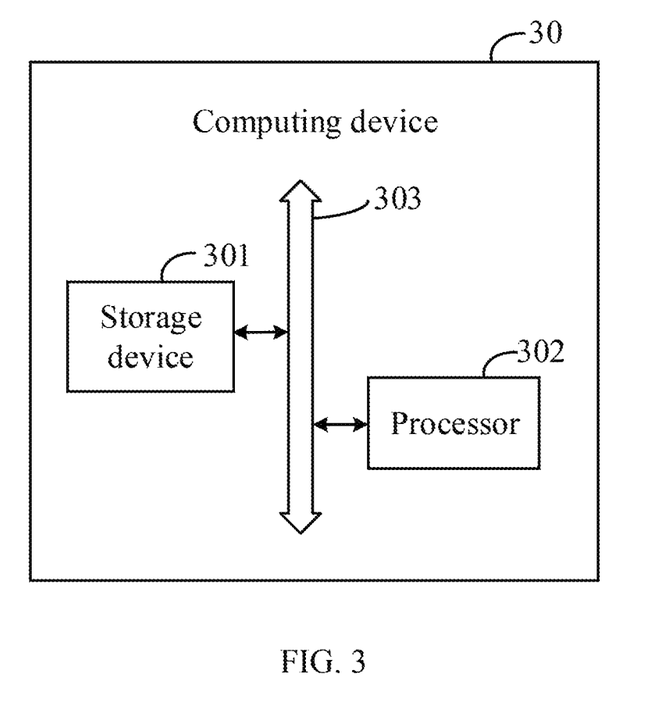
FIG. 3 is a block diagram of an embodiment of a computing device utilizing the method of FIG. 1.

FIG. 3 is a block diagram of one example embodiment of a computing device utilizing the method of FIG. 1. In an embodiment, a computing device 30 includes a storage device 301, at least one processor 302, and at least one bus 303. It should be understood by those skilled in the art that the structure of the computing device 30 shown in FIG. 3 does not constitute a limitation of the embodiment of the present disclosure. The computing device 30 may have a bus type structure or a star type structure, and the computing device 30 may further include other hardware or software, or another computing device 30 may have different component arrangements.

In at least one embodiment, the computing device 30 can include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computing device 30 is merely an example, other existing or future electronic examples are included in the scope of the present disclosure, and are included in the reference.

In some embodiments, the storage device 301 can be used to store program codes of computer readable programs and various data, such as the system 20 installed in the computing device 30, and automatically access the programs or data with high speed during running of the computing device 30. The storage device 301 can include a read-only memory (ROM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computing device 30 that can be used to carry or store data.

In some embodiments, the at least one processor 302 may be composed of an integrated circuit, for example, may be composed of a single packaged integrated circuit, or may be composed of multiple integrated circuits of same function or different functions. The at least one processor 302 can include one or more central processing units (CPU), a microprocessor, a digital processing chip, a graphics processor, and various control chips. The at least one processor 302 is a control unit of the computing device 30 which connects various components of the computing device 30 using various interfaces and lines. By running or executing a computer program or modules stored in the storage device 301, and by invoking the data stored in the storage device 301, the at least one processor 302 can perform various functions of the computing device 30 and process data of the computing device 30. For example, the functions of performing face swap.

In some embodiments, the bus 303 is used to achieve communication between the storage device 301 and the at least one processor 302, and other components of the computing device 30.

Although not shown, the computing device 30 may further include a power supply (such as a battery) for powering various components. Preferably, the power supply may be logically connected to the at least one processor 302 through a power management device, thereby, the power management device manages functions such as charging, discharging, and power management. The power supply may include one or more DC or AC power sources, a recharging device, a power failure detection circuit, a power converter or inverter, a power status indicator, and the like. The computing device 30 may further include various sensors, such as a BLUETOOTH module, a WI-FI module, and the like, and details are not described herein.

In at least one embodiment, as shown in FIG. 3, the at least one processor 302 can execute various types of applications (such as the system 20) installed in the computing device 30, program codes, and the like. For example, the at least one processor 302 can execute the modules 201-204 of the system 20.

In at least one embodiment, the storage device 301 stores program codes. The at least one processor 302 can invoke the program codes stored in the storage device to perform functions. For example, the modules described in FIG. 2 are program codes stored in the storage device 301 and executed by the at least one processor 302, to implement the functions of the various modules for the purpose of face swap.

In at least one embodiment, the storage device 301 stores one or more instructions (i.e., at least one instruction) that are executed by the at least one processor 302 to achieve the purposes of face swap.

In at least one embodiment, the at least one processor 302 can execute the at least one instruction stored in the storage device 301 to perform the operations shown in FIG. 1.

The steps in the method of the embodiments of the present disclosure may be sequentially adjusted, merged, and deleted according to actual needs.

The above description is mere embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A face swap method being executed by a computing device, the method comprising:
   segmenting a first head image from a destination image;
   detecting first facial landmarks in the first head image;
   detecting a first hair region in the first head image, and obtaining a first hair mask according to the first hair region;
   segmenting a second head image from a source image;
   detecting second facial landmarks in the second head image;
   detecting a second hair region in the second head image, and obtaining a second hair mask according to the second hair region;
   determining whether any eye landmark in the second facial landmarks is covered by hair according to the second hair mask;
   in response that at least one eye landmark in the second facial landmarks is covered by hair, repairing the second head image and the second hair mask according to mirror landmarks of the at least one eye landmark to obtain a second repaired head image and a second repaired hair mask;
   segmenting a second facial image from the second repaired head image according to the second repaired hair mask;
   synthesizing the second facial image on the first head image according to the first facial landmarks to obtain a first synthetic image;
   covering the first hair region over the first synthetic image according to the first hair mask to obtain a second synthetic image; and
   filling the second synthetic image back to segmented destination image to obtain a face swap image.

2. The method according to claim 1, wherein a method of segmenting the first head image from the destination image comprises:
   detecting a first face bounding box in the destination image; and
   obtaining the first head image according to the first face bounding box.

3. The method according to claim 1, wherein in response that at least one eye landmark in the second facial landmarks is covered by hair, the method further comprises:
   determining whether a quantity of the at least one eye landmark is larger than a preset number or determining whether a ratio of the at least one eye landmark to overall eye landmarks in the second facial landmarks is larger than a preset ratio; and
   requiring re-entering of the source image in response that the quantity is larger than the preset number or the ratio is larger than a preset ratio.

4. The method according to claim 1, wherein before repairing the second head image and the second hair mask, the method further comprises:
   determining whether any mirror landmark of the at least one eye landmark is covered by hair; and
   requiring re-entering of the source image in response that at least one mirror landmark of the at least one eye landmark is covered by hair.

5. The method according to claim 1, wherein a method of repairing the second head image according to the mirror landmarks of the at least one eye landmark comprises:
   partitioning the second head image into multiple triangles according to the second facial landmarks using Delaunay triangulation;
   performing affine transformation on each triangle of the multiple triangles according to mirror landmarks of second facial landmarks containing the triangle to obtain a transformed triangle;
   horizontally flipping the second head image to obtain a second flipped head image; and
   replacing a triangle corresponding to the at least one eye landmark in the second head image with the transformed triangle corresponding to the at least one eye landmark in the second flipped head image.

6. The method according to claim 1, wherein before repairing the second head image, the method further comprises:
   adjusting right eye landmarks and left eye landmarks in the first facial landmarks; and
   adjusting nose landmarks in the first facial landmarks.

7. The method according to claim 1, wherein before segmenting the second facial image from the second repaired head image according to the second repaired hair mask, the method further comprises:
   segmenting a first facial image from the first head image according to the second repaired hair mask; and
   adjusting skin tones of the second facial image according to the first facial image, wherein
   a method of adjusting skin tones of the second facial image according to the first facial image comprises:
   converting the first facial image from RGB space to HSV space to obtain a first HSV facial image, calculating modal values of H component, S component, and V component of the first HSV facial image, and filling the first facial image using the modal values to obtain a first filled image;
   replacing corners of mouth and lower cheeks in the first HSV facial image with corresponding portions of the first filled image;
   linearly adding pixel values of the first HSV facial image and pixel values of the first filled image to obtain a first smooth image;
   blurring out the first smooth image and the second facial image applying Gaussian blur to obtain a first blurred image and a second blurred image; and dividing the first blurred image by the second blurred image to obtain a quotient, and multiplying the quotient and the second facial image.

8. A computing device comprising:
a storage device;
at least one processor; and
the storage device storing one or more programs, which when executed by the at least one processor, cause the at least one processor to perform operations comprising:
segmenting a first head image from a destination image;
detecting first facial landmarks in the first head image;
detecting a first hair region in the first head image, and obtaining a first hair mask according to the first hair region;
segmenting a second head image from a source image;
detecting second facial landmarks in the second head image;
detecting a second hair region in the second head image, and obtaining a second hair mask according to the second hair region;
determining whether any eye landmark in the second facial landmarks is covered by hair according to the second hair mask;
in response that at least one eye landmark in the second facial landmarks is covered by hair, repairing the second head image and the second hair mask according to mirror landmarks of the at least one eye landmark to obtain a second repaired head image and a second repaired hair mask;
segmenting a second facial image from the second repaired head image according to the second repaired hair mask;
synthesizing the second facial image on the first head image according to the first facial landmarks to obtain a first synthetic image;
covering the first hair region over the first synthetic image according to the first hair mask to obtain a second synthetic image; and
filling the second synthetic image back to segmented destination image to obtain a face swap image.

9. The computing device according to claim 8, a method of segmenting the first head image from the destination image comprises:
detecting a first face bounding box in the destination image; and
obtaining the first head image according to the first face bounding box.

10. The computing device according to claim 8, wherein in response that at least one eye landmark in the second facial landmarks is covered by hair, the at least one processor further perform operations comprising:
determining whether a quantity of the at least one eye landmark is larger than a preset number or determining whether a ratio of the at least one eye landmark to overall eye landmarks in the second facial landmarks is larger than a preset ratio; and
requiring re-entering of the source image in response that the quantity is larger than the preset number or the ratio is larger than a preset ratio.

11. The computing device according to claim 8, wherein before repairing the second head image and the second hair mask, the at least one processor further perform operations comprising:
determining whether any mirror landmark of the at least one eye landmark is covered by hair; and
requiring re-entering of the source image in response that at least one mirror landmark of the at least one eye landmark is covered by hair.

12. The computing device according to claim 8, wherein a method of repairing the second head image according to the mirror landmarks of the at least one eye landmark comprises:
partitioning the second head image into multiple triangles according to the second facial landmarks using Delaunay triangulation;
performing affine transformation on each triangle of the multiple triangles according to mirror landmarks of second facial landmarks defining the triangle to obtain a transformed triangle;
horizontally flipping the second head image to obtain a second flipped head image; and
replacing a triangle corresponding to the at least one eye landmark in the second head image with the transformed triangle corresponding to the at least one eye landmark in the second flipped head image.

13. The computing device according to claim 8, wherein before repairing the second head image, the at least one processor further perform operations comprising:
adjusting right eye landmarks and left eye landmarks in the first facial landmarks; and
adjusting nose landmarks in the first facial landmarks.

14. The computing device according to claim 8, wherein before segmenting the second facial image from the second repaired head image according to the second repaired hair mask, the at least one processor further perform operations comprising:
segmenting a first facial image from the first head image according to the second repaired hair mask; and
adjusting skin tones of the second facial image according to the first facial image, wherein
a method of adjusting skin tones of the second facial image according to the first facial image comprises:
converting the first facial image from RGB space to HSV space to obtain a first HSV facial image, calculating modal values of H component, S component, and V component of the first HSV facial image, and filling the first facial image using the modal values to obtain a first filled image;
replacing corners of mouth and lower cheeks in the first HSV facial image with corresponding portions of the first filled image;
linearly adding pixel values of the first HSV facial image and pixel values of the first filled image to obtain a first smooth image;
blurring out the first smooth image and the second facial image applying Gaussian blur to obtain a first blurred image and a second blurred image; and
dividing the first blurred image by the second blurred image to obtain a quotient, and multiplying the quotient and the second facial image.

15. A non-transitory storage medium having stored thereon instructions that, when executed by a computing device of a computing device, causes the computing device to perform a face swap method, the method comprising:
segmenting a first head image from a destination image;
detecting first facial landmarks in the first head image;
detecting a first hair region in the first head image, and obtaining a first hair mask according to the first hair region;
segmenting a second head image from a source image;
detecting second facial landmarks in the second head image;

detecting a second hair region in the second head image, and obtaining a second hair mask according to the second hair region;

determining whether any eye landmark in the second facial landmarks is covered by hair according to the second hair mask;

in response that at least one eye landmark in the second facial landmarks is covered by hair, repairing the second head image and the second hair mask according to mirror landmarks of the at least one eye landmark to obtain a second repaired head image and a second repaired hair mask;

segmenting a second facial image from the second repaired head image according to the second repaired hair mask;

synthesizing the second facial image on the first head image according to the first facial landmarks to obtain a first synthetic image;

covering the first hair region over the first synthetic image according to the first hair mask to obtain a second synthetic image; and filling the second synthetic image back to segmented destination image to obtain a face swap image.

16. The non-transitory storage medium according to claim 15, wherein in response that at least one eye landmark in the second facial landmarks is covered by hair, the method further comprises:

determining whether a quantity of the at least one eye landmark is larger than a preset number or determining whether a ratio of the at least one eye landmark to overall eye landmarks in the second facial landmarks is larger than a preset ratio; and requiring re-entering of the source image in response that the quantity is larger than the preset number or the ratio is larger than a preset ratio.

17. The non-transitory storage medium according to claim 15, wherein before repairing the second head image and the second hair mask, the method further comprises:

determining whether any mirror landmark of the at least one eye landmark is covered by hair; and requiring re-entering of the source image in response that at least one mirror landmark of the at least one eye landmark is covered by hair.

18. The non-transitory storage medium according to claim 15, wherein a method of repairing the second head image according to the mirror landmarks of the at least one eye landmark comprises:

partitioning the second head image into multiple triangles according to the second facial landmarks using Delaunay triangulation;

performing affine transformation on each triangle of the multiple triangles according to mirror landmarks of second facial landmarks defining the triangle to obtain a transformed triangle;

horizontally flipping the second head image to obtain a second flipped head image; and replacing a triangle corresponding to the at least one eye landmark in the second head image with the transformed triangle corresponding to the at least one eye landmark in the second flipped head image.

19. The non-transitory storage medium according to claim 15, wherein before repairing the second head image, the method further comprises:

adjusting right eye landmarks and left eye landmarks in the first facial landmarks; and adjusting nose landmarks in the first facial landmarks.

20. The non-transitory storage medium according to claim 15, wherein before segmenting the second facial image from the second repaired head image according to the second repaired hair mask, the method further comprises:

segmenting a first facial image from the first head image according to the second repaired hair mask; and adjusting skin tones of the second facial image according to the first facial image, wherein a method of adjusting skin tones of the second facial image according to the first facial image comprises:

converting the first facial image from RGB space to HSV space to obtain a first HSV facial image, calculating modal values of H component, S component, and V component of the first HSV facial image, and filling the first facial image using the modal values to obtain a first filled image;

replacing corners of mouth and lower cheeks in the first HSV facial image with corresponding portions of the first filled image;

linearly adding pixel values of the first HSV facial image and pixel values of the first filled image to obtain a first smooth image;

blurring out the first smooth image and the second facial image applying Gaussian blur to obtain a first blurred image and a second blurred image; and dividing the first blurred image by the second blurred image to obtain a quotient, and multiplying the quotient and the second facial image.

* * * * *